Figure 1:
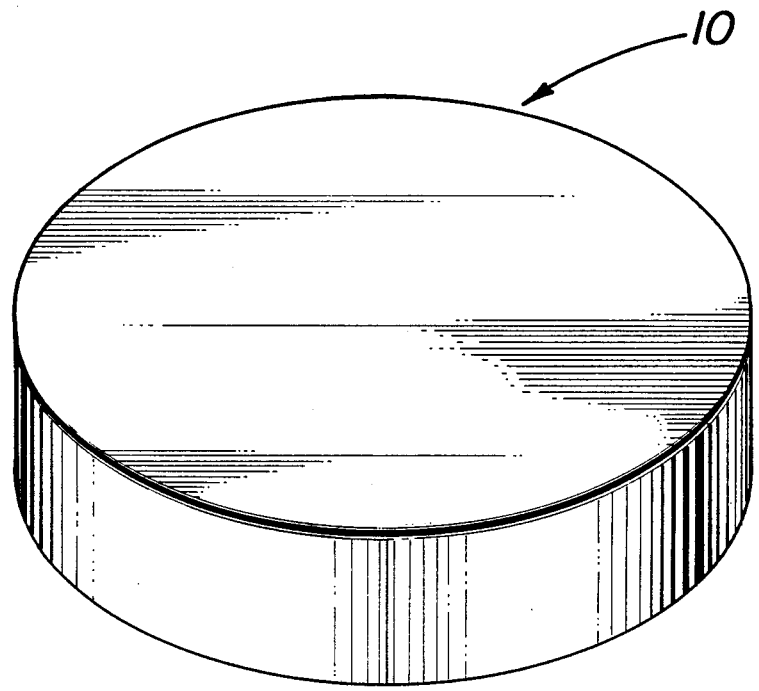

United States Patent [19]

Good

[11] Patent Number: 4,952,216

[45] Date of Patent: Aug. 28, 1990

[54] COMBUSTIBLE LOG

[75] Inventor: Elmer H. Good, Simi Valley, Calif.

[73] Assignee: Ronald G. Buday, Van Nuys, Calif. ; a part interest

[21] Appl. No.: 325,884

[22] Filed: Mar. 20, 1989

[51] Int. Cl.$^5$ .............................. C10L 5/14; C10L 5/40
[52] U.S. Cl. .......................................... 44/25; 44/535; 44/590
[58] Field of Search ............................ 44/535, 25, 590

[56] References Cited

U.S. PATENT DOCUMENTS

| 4,236,897 | 12/1980 | Johnson | 44/25 |
| 4,756,719 | 7/1988 | Saito | 44/25 |

FOREIGN PATENT DOCUMENTS

| 2711082 | 9/1977 | Fed. Rep. of Germany | 44/535 |
| 17601 | 2/1978 | Japan | 44/535 |

*Primary Examiner*—Carl F. Dees
*Attorney, Agent, or Firm*—Ellsworth R. Roston; Charles H. Schwartz

[57] ABSTRACT

A combusible member includes a first material having a density less than one (1) and constituting a plastic material in cross-linked or linear form and having properties of being converted to a non-toxic gaseous form when subjected to heat. Preferably, the first material constitutes a polyethylene such as is obtained from discarded containers for consumible products. The polyethylene may have a percentage by weight in the range of approximately sixty percent (66%) to seventy six percent (76%) in the combustible member. The combustible material also includes a combustible member having properties of being oxidized when subjected to heat. Preferably the combustible material may constitute a wood product in particulate or pulp form. The combustible material may have a percentage by weight in the range of approximately twenty percent (20%) to thirty six percent (36%) in the combustible member. A binder having a melt index less than two thousand (2000) is also included in the combustible member. The binder may constitute a small percentage by weight in the combustible member such as a range of approximately four percent (4%) to twenty percent (20%) by weight. The binder may have a density greater than one (1). The binder may constitute a low density polyethylene.

33 Claims, 1 Drawing Sheet

COMBUSTIBLE LOG

This invention relates to combustible members and more particularly relates to combustible members formed from discarded materials and having properties of providing a long, clean and non-toxic combustion with the generation of considerable amounts of heat per unit volume of the combustible members. The invention also relates to methods of producing such combustible members.

The problem of disposing of waste materials has become of increasing concern in recent years. Presently existed landfills are becoming rapidly filled and new landfills cannot be easily found or readily accepted Furthermore, the combustion of such waste materials tends to produce noxious fumes. No acceptable solution has been found as yet to dispose of such waste materials even though the problem is being addressed with increasing urgency.

There is also a continuing problem of providing combustible members such as logs for fireplaces. Logs made from limbs of trees are often used but these are heavy and bulky and also require the consumption of natural resources. The logs often do not last long in the fireplace when they are burned. Other types of logs such as those made from pressed materials often present difficulties because they are not easily ignited or burned and are expensive and are quite bulky and heavy in relation to the amount of heat that is generated.

This invention provides a combustible member which overcomes the disadvantages discussed in the previous two paragraphs. The combustible member of this invention primarily uses waste material for which other uses do not exist at present. The combustible member generates large amounts of heat per unit volume of the member. It generates gases which are not toxic. It can be easily formed and can be sold at relatively low prices.

In one embodiment of the invention, a combustible member includes a first material having a density less than one (1) and constituting a plastic material in cross-linked or linear form and having properties of being converted to a non-toxic gaseous form when subjected to heat. Preferably, the first material constitutes a polyethylene such as is obtained from discarded containers for consumible products. The polyethylene may have a percentage by weight in the range of approximately sixty percent (60%) to seventy six percent (76%) in the combustible member.

The combustible member also includes a combustible member having properties of being oxidized when subjected to heat. Preferably the combustible material may constitute a wood product in particulate or pulp form. The combustible material may have a percentage by weight in the range of approximately twenty percent (20%) to thirty six percent (36%) in the combustible member.

A binder having a melt index less than two thousand (2000) is also included in the combustible member. The binder may constitute a small percentage by weight in the combustible member such as a range of approximately four percent (4%) to twenty percent (20%) by weight. The binder may have a density greater than one (1). The binder may constitute a low density polyethylene.

The single FIGURE is a schematic perspective view of a combustible member constituting one embodiment of the invention.

In one embodiment of the invention, a combustible member generally indicated at 10 is provided. The combustible member includes a first material having a density less than one (1) and constituting a plastic material in cross-linked or linear form. Since the material has a density less than one (1), it floats in water. Because of this, it can be easily separated from other waste material. Preferably the first material constitutes a scrap polyethylene such as that obtained from plastic milk containers or orange juice containers. The first material may be included in the member 10 in the range of approximately sixty percent (60%) to approximately seventy six percent (76%) by weight.

The combusible member 10 also includes a second material having combustible properties. Preferably the second material constitutes a wood product such as paper or wood and is preferably in particulate (such as sawdust) or pulp form. The wood product may be included in the member 10 in approximately the range of twenty percent (20%) to approximately thirty six percent (36%) by weight.

The combustible material also includes a binder. Preferably the binder has a melt index less than approximately two thousand (2000) so that it melts relatively easily when heat is applied to it. The binder also preferably has a low density. The binder preferably comprises a low density polyethylene. It may be included in the member 10 in the ratio of approximately six percent (6%) to twenty percent (20%) by weight.

The first and second materials and the binder may be mixed in a suitable machine such as a Banbury machine. Such a machine is desirable because it mixes the different materials and melts the materials to an extrudable form as by friction during such mixing. The resultant extrudable mixture may then be extruded into a suitable shape such as the shape and size of a hockey puck such as shown in the single Figure.

The combustible member 10 has certain important advantages. It provides a large amount of heat per unit of volume. It combusts totally so that the only material remaining is ash from the wood and/or paper. None of the gases produced in the combustion is noxious. For example, the polyethylene may be converted during the combustion to ethane. Ethane is not noxious. Ethane can be oxidized during the combustion to carbon dioxide and water.

Although this invention has been disclosed and illustrated with reference to particular embodiments, the principles involved are susceptible for use in numerous other embodiments which will be apparent to person skilled in the art. The invention is, therefore, to be limited only as indicated by the scope of the appended claims.

I claim:

1. A combustible member, including,
    a first polyethylene having a density less than one (1) and constituting the major portion by weight in the member,
    a second polyethylene having a melt index less than approximately two thousand (2000) and constituting a relatively small percentage of the member by weight, and
    a wood pulp constituting a percentage by weight less than the percentage of the first polyethylene by weight and greater than the percentage of the second polyethylene by weight.

2. A combustible member as set forth in claim 1 wherein the first polyethylene is obtained from discarded containers for consumible products.

3. A combustible member as set forth in claim 1 wherein
the first polyethylene has a percentage by weight in the combustible member in the range of approximately sixty percent (60%) to approximately seventy six percent (76%).

4. A combustible member as set forth in claim 1 wherein
the wood pulp has a percentage by weight in the combustible member in the range of approximately twenty percent (20%) to approximately thirty six percent (36%).

5. A combustible member as set forth in claim 1 wherein
the second polyethylene has a percentage by weight in the combustible member in the range of approximately four percent (4%) to approximately twenty percent (20%).

6. A combustible member, including,
a polyethylene having a density less than one (1),
an oxidizible material in particulate or pulp form, and
a material having properties of melting quickly when subjected to heat and constituting a binder for the polyethylene and the oxidizible material.

7. A combustible member as set forth in claim 6, including,
the oxidizible material constituting a wood product in pulp or particulate form.

8. A combustible member as set forth in claim 6, including,
the material constituting the binder having a melt index no greater than approximately two thousand (2000).

9. A combustible material as set forth in claim 6 wherein
the polyethylene has a percentage by weight in the combustible member in the range of approximately sixty percent (60%) to approximately seventy six percent (76%).

10. A combustible material as set forth in claim 6 wherein
the oxidizible material has a percentage by weight in the combustible member in the range of approximately twenty percent (20%) to approximately thirty six percent (36%).

11. A combustible material as set forth in claim 6 wherein
the binder material has a percentage by weight in the combustible member in the range of approximately four percent (4%) to approximately twenty percent (20%).

12. A combustible member as set forth in claim 11 wherein
the binder constitutes a polyethylene with a melt index less than approximately two thousand (2000).

13. A combustible member comprising a mixture of the following materials,
a first material having a density less than one (1) and constituting a plastic material in cross-linked or linear form and having properties of being converted to a non-toxic gaseous form when subjected to heat,
a combustible material having properties of being oxidized when subjected to heat, and
a binder having a melt index less than approximately two thousand (2000).

14. A combustible member as set forth in claim 13 wherein
the first material has a percentage by weight in the combustible member in the range of approximately sixty percent (60%) to approximately seventy six percent (76%).

15. A combustible member as set forth in claim 13 wherein
the second material is in pulp or particulate form.

16. A combustible member as set forth in claim 13 wherein
the combustible material has a percentage by weight in the combustible member of approximately twenty percent (20%) to approximately thirty six percent (36%).

17. A combustible member as set forth in claim 13 wherein
the binder has a percentage by weight in the combustible member in the range of approximately four percent (4%) to approximately twenty percent (20%) by weight.

18. A combustible member as set forth in claim 13 wherein
the combustible material constitutes a wood product in pulp or particulate form.

19. A combustible member as set forth in claim 13 wherein
the binder constitutes a low density polyethylene.

20. A method of forming a combustible member, including the steps of:
providing the following materials:
(a) a material having a density less than one (1) and having properties of being converted to a non-toxic gaseous form when heated,
(b) a combustible material, and
(c) a binder having a melt index less than approximately two thousand (2000),
mixing the materials in a machine providing friction to convert the mixed materials to an extrudable form, and
extruding the mixed extrudable materials.

21. A method as set forth in claim 20, wherein
the material having the density less than one (1) is a polyethylene.

22. A method as set forth in claim 20 wherein
the combustible material is a wood product in pulp or particulate form.

23. A method as set forth in claim 20 wherein
the binder is a low density polyethylene.

24. A method as set forth in claim 21 wherein,
the binder is a low density polyethylene.

25. A method as set forth in claim 21 wherein
the combustible material is a wood product in pulp or particulate form.

26. A method as set forth in claim 20 wherein
the material having the density less than one (1) is included in the mixture in the range of approximately sixty percent (60%) to approximately seventy six percent (76%) by weight and
the combustible material is included in the mixture in the range of approximately twenty percent (20%) to approximately thirty six percent (36%) by weight and
the binder is included in the mixture in the range of approximately four percent (4%) to approximately twenty percent (20%) by weight.

27. A method of forming a combustible material, including the steps of:

providing the following materials:
(a) a polyethylene having a density less than one (1) and having properties of being converted to a non-toxic gaseous form when heated,
(b) a wood product in pulp or particulate form, and
(c) a binder having a melt index less than approximately two thousand (2000), mixing the materials in a machine providing friction to melt the mixed materials to an extrudable form, and extruding the mixed extrudable materials in the melted form.

28. A method as set forth in claim 27 wherein the binder is a polyethylene.

29. A method a set forth in claim 27 wherein the polyethylene is included in the mixture in the range of approximately sixty percent (60%) to seventy six percent (76%) by weight.

30. A method as set forth in claim 27 wherein the wood product is included in the mixture in the range of approximately twenty percent (20%) to approximately thirty six percent (36%) by weight.

31. A method as set forth in claim 27 wherein the binder is a polyethylene and is included in the mixture in the range of approximately four percent (4%) to approximately twenty percent (20%) by weight.

32. A combustible member as set forth in claim 1 wherein
the wood pulp has a percentage by weight in the combustible member in the range of approximately twenty percent (20%) to approximately thirty six percent (36%) and
the second polyethylene has a percentage by weight in the combustible member in the range of approximately four percent (4%) to approximately twenty percent (20%).

33. A method as set forth in claim 29 wherein
the wood product is included in the mixture in the range of approximately twenty percent (20%) to approximately thirty six percent (36%) by weight and
the binder is a polyethylene and is included in the mixture in the range of approximately four percent (4%) to approximately twenty percent (20%) by weight

* * * * *